United States Patent [19]

Kanda

[11] Patent Number: 6,055,066
[45] Date of Patent: Apr. 25, 2000

[54] SYSTEM FOR CORRECTING IMAGE DATA IN AN IMAGE SCANNER

[75] Inventor: Masao Kanda, Saitama-ken, Japan

[73] Assignee: Pioneer Electronic Corporation, Tokyo, Japan

[21] Appl. No.: 08/608,459

[22] Filed: Feb. 28, 1996

[30] Foreign Application Priority Data

Feb. 28, 1995 [JP] Japan .................................. 7-040958
Feb. 28, 1995 [JP] Japan .................................. 7-040960

[51] Int. Cl.⁷ ..................................................... H04N 1/40
[52] U.S. Cl. ........................... 358/461; 358/446; 358/448
[58] Field of Search .................................. 358/461, 462, 358/464, 448, 447, 446

[56] References Cited

U.S. PATENT DOCUMENTS

| | | | |
|---|---|---|---|
| 4,870,501 | 9/1989 | Yoshida | 358/461 |
| 5,291,307 | 3/1994 | Luckhurst | 358/446 |
| 5,402,252 | 3/1995 | Kojima | 358/447 |
| 5,412,489 | 5/1995 | Hirota | 358/461 |

*Primary Examiner*—Thomas D Lee
*Attorney, Agent, or Firm*—Nikaido Marmelstein Murray & Oram, LLP

[57] ABSTRACT

A lens is provided for converging rays reflected from an object, and a line sensor is provided for receiving rays converged by the lens. The line sensor has a plurality of photoelectric conversion elements corresponding to predetermined pixels of one line. White level correction data are obtained for correcting a deviation of an output signal of each photoelectric conversion element from a standard value, and plane correction data is obtained for correcting unequal distribution of quantity of light dependent on the lens. An output signal of the line sensor is corrected with the white correction data and the plane correction data.

7 Claims, 11 Drawing Sheets

PG110mm TABLE OF VIGNETTING FACTOR (UNIT %)

| HEIGHT OF IMAGE | F5.6 ∞ | ANGLE θ |
|---|---|---|
| 0mm | 100.00 | 0.00° |
| 5mm | 100.00 | 2.65° |
| 10mm | 100.00 | 5.29° |
| 15mm | 100.00 | 7.91° |
| 20mm | 99.93 | 10.49° |
| 25mm | 99.93 | 13.03° |
| 30mm | 99.86 | 15.52° |
| 35mm | 96.12 | 17.96° |
| 40mm | 80.25 | 20.32° |
| 45mm | 58.18 | 22.62° |

SYSTEM FOR CORRECTING IMAGE DATA IN AN IMAGE SCANNER

BACKGROUND OF THE INVENTION

The present invention relates to a system for correcting image data in an image scanner of a camera type having a line image sensor for obtaining image data, and more particularly to a correcting system where the image data are properly corrected, thereby preventing distortion of shading.

The line image sensor has a plurality of photoelectric conversion elements aligned on the surface thereof.

In a copy machine or a facsimile machine, a scanner of a flat bed type is used. The scanner comprises a light source and a CCD sensor which are integrally assembled in plane. An image of a draft is lit up with the light source and the light reflected from the draft is applied to the CCD sensor. The CCD sensor is moved in plane along the entire surface of the draft to scan the plane image.

FIG. 12 shows a conventional system having a scanner of a flat bed type. A scanner 1 comprises a light source 2 such as a fluorescent lamp and a CCD sensor 3. An image draft 4 is put on a transparent panel (not shown) in parallel with the scanner 1 which is movable in the direction shown by arrows. The light emitted from the light source 2 illuminates the draft 4 and the reflected light is applied to the CCD sensor 3 to produce a data signal of the image.

In such a system, since the light source 2 emits the rectilinear light, the quantity of light becomes poor at peripheral portions of the draft 4, or the CCD sensor 3 may have unequal sensitivity distribution. Such defects cause distortion of shading. Therefore, it is necessary to correct a white level of the output signal of the CCD sensor to correct the shading.

For correcting the distortion, a standard white sheet 5 is provided. The standard white sheet 5 is read by the CCD sensor 3 every time before the draft 4 is read. Thus, correction data including the unequal distribution of the light quantity and the unequal sensitivity distribution of the CCD sensor 3 is obtained. The actual data of the draft 4 is corrected in accordance with the correction data.

On the other hand, a scanner of a camera type has been developed recently. FIG. 13 shows another conventional system having a camera type scanner. A camera type scanner 9 comprises a line image sensor 8 to be moved in the directions shown by arrows and an optical system such as a lens 6 disposed in front of the line image sensor 8. An object 7 is illuminated with beams of light emitted from light sources 10 and the reflected light is applied to the line image sensor 8 through the lens 6.

The line image sensor 8 has a photoelectric conversion portion corresponding to a predetermined number of pixels per one line. The sensor produces line data in accordance with electric signals of the photoelectric conversion portion. The sensor scans pixels on a predetermined number of lines so that image data can be obtained.

Thus, in the camera type scanner 9, it is possible to read an image not only of a plane object but also a cubic object. The position of the light source 10 is desirably set in dependency on the shape and size of the object.

In particular, in the case that the image of the cubic object is read by the scanner 9, it is not necessary to consider the inequality of illumination caused by the light source and the shade, because such defects represent meanings for the object. However, it is necessary to correct unequal distribution of quality of the lens 6 as well as the unequal distribution of sensitivity of the line image sensor 8.

In order to correct the distortion of shading caused by the lens 6 and the sensor 8, if the standard white sheet 5 is used, problems arise as follows.

The line image sensor 8 has photoelectric conversion section disposed in the first dimensional direction. The sensor is moved in each line by a step motor in the direction perpendicular to the first dimensional direction in synchronism with a reading operation of the image, so that the image data for one sheet picture is obtained. Consequently, the unequal distribution of the lens quality spreads in the second dimensional direction. Accordingly, it is necessary to obtain the correction data of the unequal distribution of the whole area of the one sheet picture.

If the image of the whole area is composed of pixels of 5000×4000, and data of 8 bit is allotted for one pixel, correction data of 5000×4000×8×3→ about 60 Mbyte for the three primary colors R, G and B, and a memory having a capacity for storing the correction data must be provided.

Namely, only in the case of the inequality of light of the lens 6, the amount of data becomes extremely large. Therefore, in the system wherein the correction data for the unequal light is complemented before reading the image data, it takes a long time to read data, resulting in decreasing of operability. In addition, in order to provide a memory having such a large capacity, the scale of the circuit is increased, which is on obstacle for miniaturizing the system and reducing the manufacturing cost thereof.

On the other hand, the CCD sensor has an inherent defect that a dark current is produced. If the CCD sensor is driven at a high speed, the temperature of the sensor increases, which causes the dark current to increase. In order to exactly read a half tone of a picture, it is necessary to correct a black level of an output signal of the CCD sensor before reading the data.

There are two methods for correcting the black level. One of the methods is to use a standard black level sheet, and the other method is to shield the outside light.

Japanese Patent Publication 5-36987 discloses a method for correcting a black level using the standard black sheet, in order to reduce an error in the black level correction data caused by dust stuck to the standard sheet.

FIG. 14 shows a conventional scanner system having a standard black level sheet 5'. The image draft 4 is put on a transparent panel 14 such as a glass in parallel with the CCD sensor 3 which is movable in the direction shown by an arrow. The standard black level sheet 5' is provided on the panel 14. The standard black level sheet 5' is read by the CCD sensor 3 every time before the draft 4 is read. Thus, the black level is corrected based on an output of the CCD sensor 3.

FIG. 15 shows the other method. A camera type scanner system 15 comprises a CCD sensor 16 applied with a beam through a lens 11. A total reflection mirror 12 is provided between the lens 11 and the sensor 16. The mirror 12 is moved down for reflecting the light therefrom, thereby shielding the sensor from the light.

FIG. 16 shows another method for shielding the light. A light shielding plate 13 is provided in an end portion of a scanning area of the CCD sensor 16.

In the method, the black level is corrected based on an output of the CCD sensor 16.

However, in the former method, it is necessary to read the standard black level sheet 5' before the draft 4 is read in order to obtain image data. Consequently, it takes a long time to read the draft 4 by the CCD sensor 3. Furthermore, it is necessary to provide a scanning area for reading the standard sheet 5' in addition to the scanning area for reading the draft 4. Since the scanning area is increased, the system can not be made into a small scale.

In the latter method, it is also necessary to obtain a correction data before the image data is taken. Therefore, it takes a long time to obtain image data. Furthermore, it is difficult to completely shield the CCD sensor 16 from the light. Since the light may leak to inside portions of the total reflection mirror 12 or the light shielding plate 13 by diffraction, the CCD sensor 16 is not completely shielded. As a result, the black level is not properly corrected.

In the method of FIG. 15, it is necessary to provide a mechanism to move the mirror 12. Consequently, the system can not be simplified in structure. In the method of FIG. 16, since it is necessary to provide a scanning area for the shielding plate 13 in addition to the scanning area for the image data, the scanning area is increased. Therefore, the system can not be made in a small scale.

Furthermore, in both methods, the level of the output for the correction data in a dark period is extremely low in any methods. Consequently, it is difficult to obtain the output for the dark period at a good S/N ratio.

As a further method, in the camera type scanner system 15 of FIG. 15, the lens 11 is covered with a cap, or the system is disposed in a dark room. However, since such working must be done at every black level correction, the operability of the system is reduced.

SUMMARY OF THE INVENTION

An object of the present invention is to provide an image scanner system in which a white level of a signal is properly corrected, thereby eliminating distortion of shading.

Another object of the present invention is to provide an image scanner system in which a black level of the signal is properly corrected with a simple structure.

A further object of the present invention is to provide an image scanner system which may improve operability with a small size and lower the manufacturing cost of the system.

According to the present invention, there is provided a system for correcting image data comprising a lens for converging rays reflected from an object, a line sensor receiving rays converged by the lens and having a plurality of photoelectric conversion elements corresponding to predetermined pixels of one line, means for obtaining white level correction data for correcting a deviation of an output signal of each photoelectric conversion element from a standard value, means for obtaining plane correction data for correcting unequal distribution of quantity of light dependent on the lens, and correcting means for correcting an output signal of the line sensor with the white correction data and the plane data.

The deviation of the output signal is a deviation from an average value of the whole output signal, and the correcting means is means for multiplying the output signal of the line sensor by the white correction data and the plane data.

A black level correcting system is provided for producing black level correction data for correcting the output signal of the line sensor.

The black level correcting system comprises means for producing a dark correction data from an output signal of the line sensor in a dark condition, means for detecting temperature of the line sensor, means for setting an accumulation time of each of the photoelectric conversion elements, correcting means for correcting the output signal of the line sensor with the dark correction data, a detected temperature, and a set accumulation time.

These and other objects and features of the present invention will become more apparent from the following detailed description with reference to the accompanying drawings.

DETAILED DESCRIPTION OF THE PREFERRED EMBODIMENTS

Figure 1:
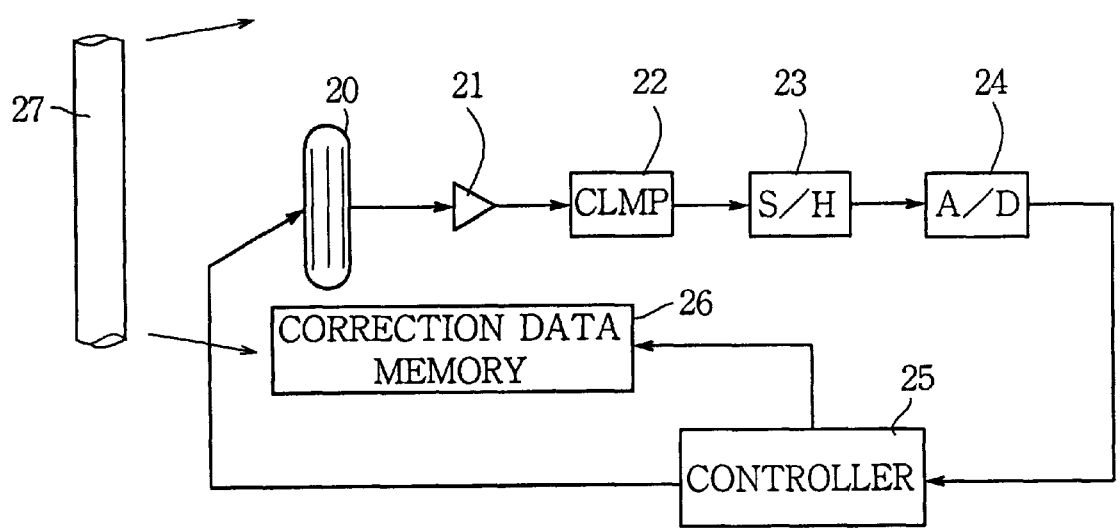
FIG. 1 is a schematic diagram showing an image scanner system of the present invention for explaining a white level correction.

Referring to FIG. 1 showing a camera type scanner system of the present invention, the scanner system is adapted to obtain the white level correction data.

A line image sensor 20 such as CCD sensor has photoelectric conversion elements the number of which is the same as the predetermined pixels of one line. The photoelectric conversion element produces a voltage signal in proportion to the quantity of light (light exposure) applied to the sensor during a predetermined accumulation time (for example, 10 ms) set by a controller 25.

The line image sensor 20 produces an output signal in proportion to the light exposure and to the accumulation time. The signal is amplified by an amplifier 21 to a necessary predetermined level. A clamper 22 and a sample and hold circuit 23 are provided for reducing noises of the amplified signal.

In order to reduce noises, a well known CDS (Correlated Double Sampling) circuit is employed. The noises are regulated by using a correlation of noises at a precharge portion and a data portion of an output of the sensor.

The signal is converted into a digital signal by an A/D converter 24 and applied to the controller 25. The controller 25 calculates a correction data of the white level with respect to the light exposure and the calculated correction data are stored in a correction data memory 26. A necessary storage capacity is 5000×8×3→about 0.11 Mbyte The accumulation time by the sensor 20 is set to a necessary period.

A standard light source 27 is a fluorescent lamp. The light source 27 is disposed such that the light emitted from the light source is applied to the scanning position of the sensor as parallel light, and the uniform quantity of light is applied to the whole of the light receiving portion of the sensor corresponding to 5000 pixels of one line.

Figure 2:
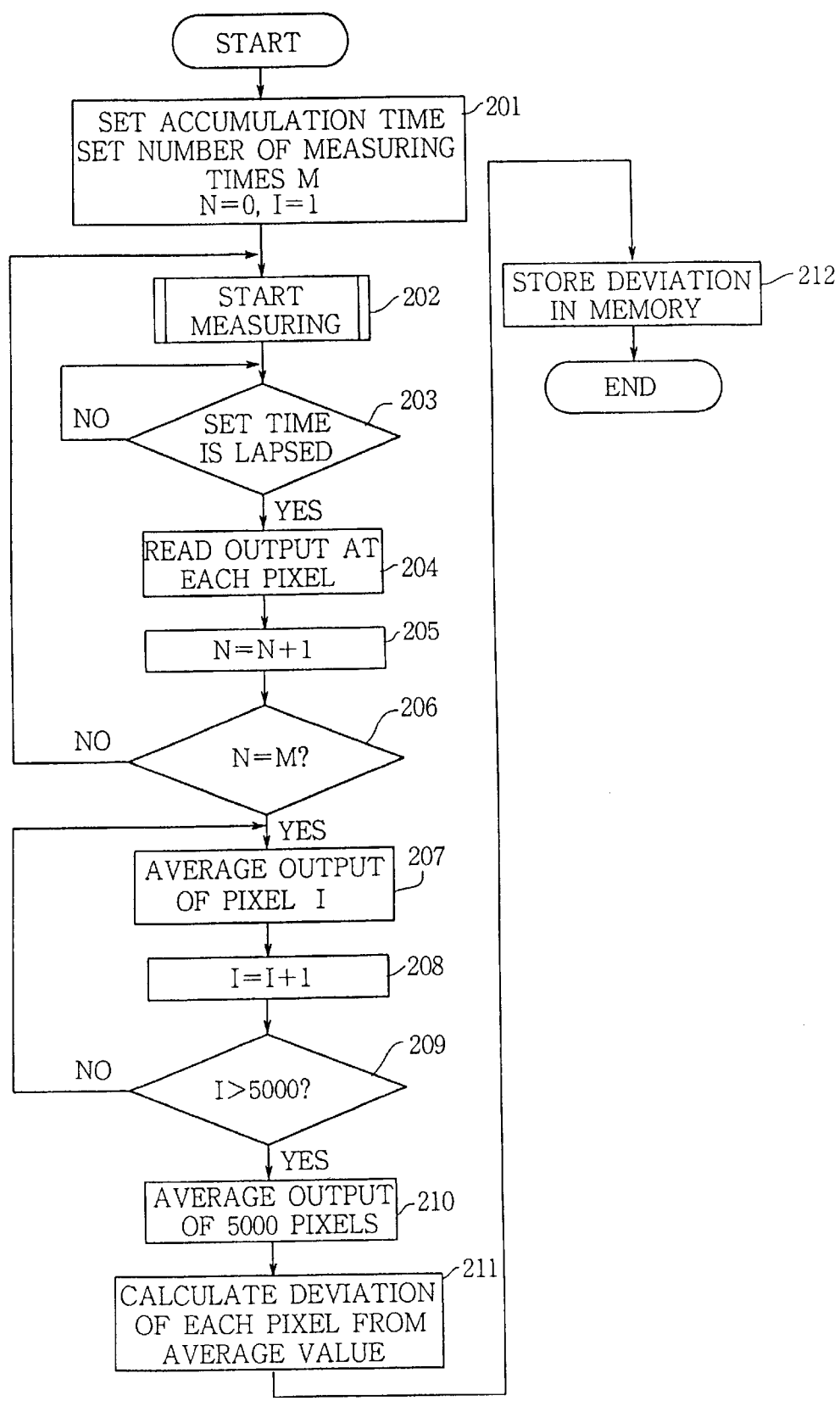
FIG. 2 is a flowchart showing an operation for reading correction data of a white level of an image signal.

The operation for obtaining a first correction data for correcting the white level of the signal with respect to the unequal distribution of sensitivity of the photoelectric conversion elements of the line image sensor will be described with reference to the flowchart of FIG. 2.

At a step 201, an initial set is performed. Namely, the accumulation time and the number of measuring times M are set. In the operation, the sensitivity is measured several times for eliminating influence of random noises. The average value of data obtained by measuring several times is calculated so that the S/N ratio of the data is further improved.

The measurement is started at a step 202. When the set accumulation time lapses at a step 203, an output at each of the pixels of one line at a first scanning line is read at a step 204. When the first reading of the output is finished, a second reading is performed at a step 205 setting N=N+1 and repeated until M time. When N=M at a step 206, averaging of the values of outputs per pixel of one line is averaged at a step 207. Averaging process is performed for all pixels (5000) of one line at steps 207–209.

At a step 210, averaging of output values at all pixels 5000 is performed. At a step 211, a deviation (ratio) of each pixel from the average value of all pixels is calculated. An inverse number of the deviation is stored in the correction data memory 26 at a step 212.

Figures 3, 4:
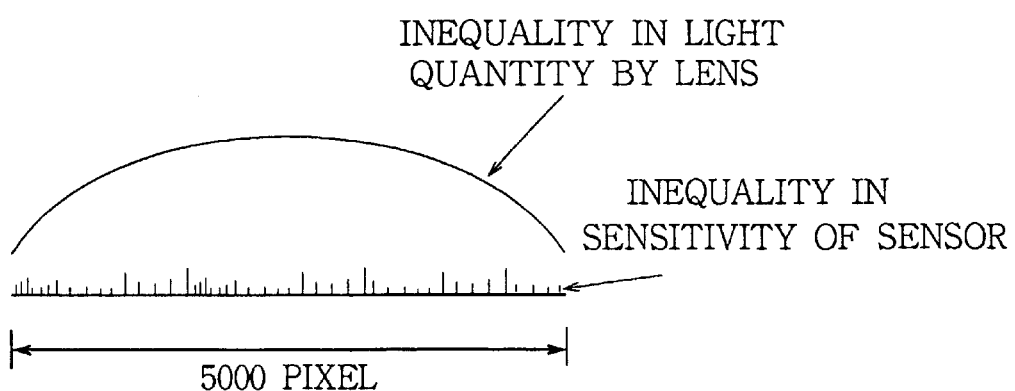
FIG. 3 is a diagram showing a table of vignetting factor of a lens.
FIG. 4 is a diagram showing inequality distribution of quality of the lens and a sensor.

On the other hand, the unequal distribution of the quantity of light caused by the lens depends on the vignetting factor of the lens. FIG. 3 shows the vignetting factors of the lens where the diaphragm of the lens is fully opened in order to obtain the brightest image (f number is 5.6), and a focal length is positioned to the infinity. It will be seen that the unequal distribution of the quantity of light of the lens has a slow curvature as shown in FIG. 4. Thus, it is not necessary to complement the data at every pixel of one line. However, it is necessary to take plane correction data with respect to the whole plane of a picture.

The number of pixels for one picture obtained by the scan of the sensor 20 is 5000×4000. For example, the area of 16×16 pixels can be represented by one data. In that case, the plane correction data of the unequal distribution of quantity of light is totally 5000×4000×8×(1/16)×(1/16)→ about 0.6 Mbyte In the sensor 20, if a filter comprising a capacitor and a resistor is used, an interpolation data in a line direction is easily obtained. However, it is difficult to interpolate data in a scanning direction. Thus, the correction data is represented by 64 pixels in the line direction and 4 pixels in the scanning direction (64×4).

It is not always necessary to form 256 correction positions on the whole surface of the lens. Vignetting factors at position which are at the same distance from the center of the lens are equal to each other. Therefore, the surface of the lens is divided, for example, into four blocks, and one of the blocks is divided into 256 positions, and plane correction data at each position may be obtained. Plane correction data for the residual blocks may be calculated based on the correction data at corresponding positions.

Figure 5:
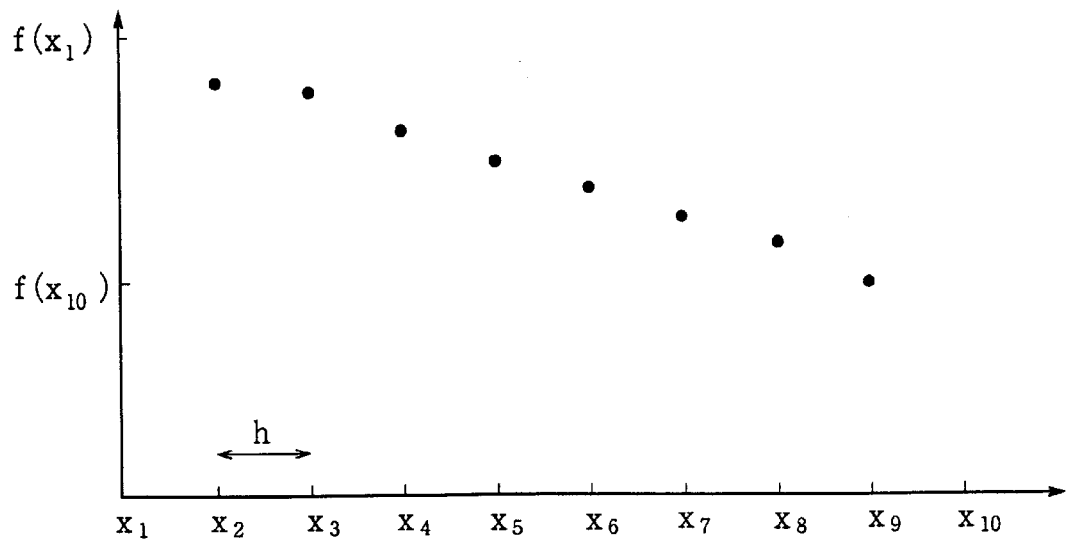
FIG. 5 is a diagram showing the vignetting factor for a ready-made lens.

It is possible to complement the vignetting factor of the lens at designing thereof. In the case of a ready-made lens, it may happen that a vignetting factor for only typical heights h of the image is given. FIG. 5 shows vignetting factors at points from x1 to x10 of the typical heights of the image. An interval between the adjacent points is interpolated by Lagrange's interpolation formula for obtaining the correction data.

The correction data for the lens is uses the inverse number thereof.

The amount of white level correction data is the total of 0.11 Mbyte for unequal distribution of sensitivity of the line sensor 20 at every pixel and 0.6 Mbyte for the quantity of light, that is about 1 Mbyte. The data are stored in the memory 26 before the lens and the sensor 20 are assembled in the scanner.

Figure 7:
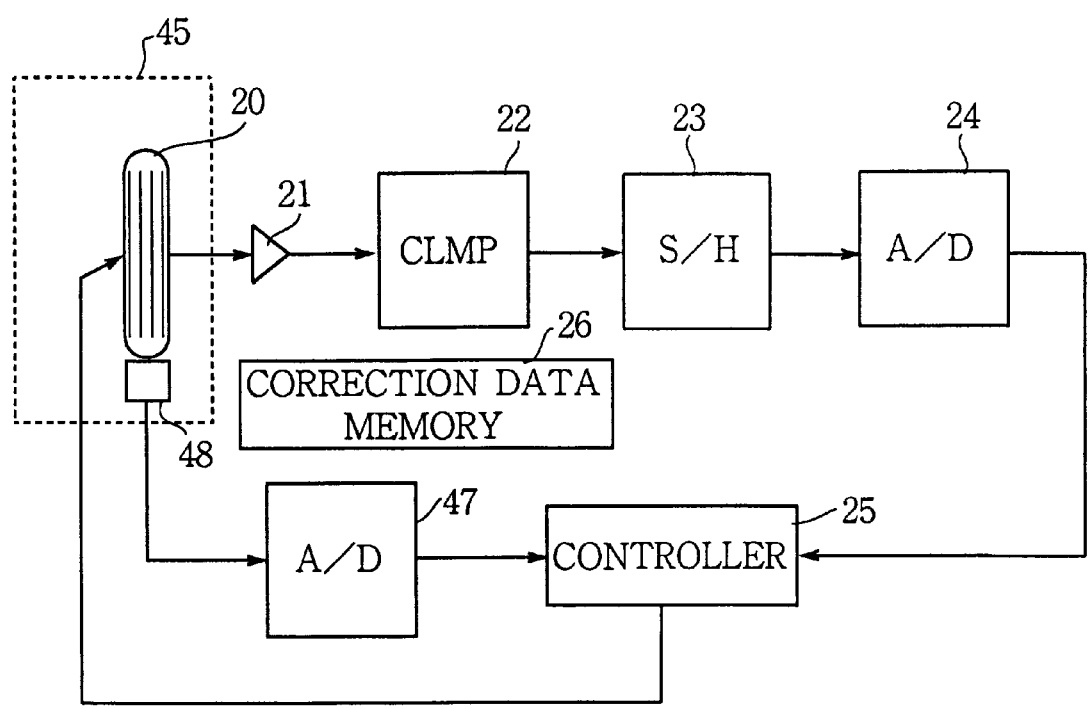
FIG. 7 is a schematic diagram showing an image scanner system for explaining a black level correction according to the present invention.

FIG. 7 shows an image scanner system having a memory for a black level correction data. The sensor 20 is provided in a standard dark room 45 for obtaining a first black level correction data of a black level. A temperature sensor 48 is provided on a surface of the line sensor 20 for detecting the temperature of the surface of the sensor. The detected temperature is applied to the controller 25 through an A/D) converter 47.

Other structures are the same as the system of FIG. 1 and the same parts are identified with the same reference numerals as FIG. 1.

The sensor 20 produces an output signal in a dark period in the dark room 45. The signal is applied to the controller 25 as a dark correction data, through the amplifier 21, clamper 22, sample and hold circuit 23, and A/D converter 24. The temperature detected by the sensor 48 is applied to the A/D converter 47 in which the signal is converted into a digital signal. The converted digital signal is applied to the controller 25. The controller 25 calculates data of the signal by the sensor 20 based on the temperature by the sensor 48 and averages the data, thereby obtaining a first black level correction data which is stored in the memory (ROM) 26.

Figure 8:
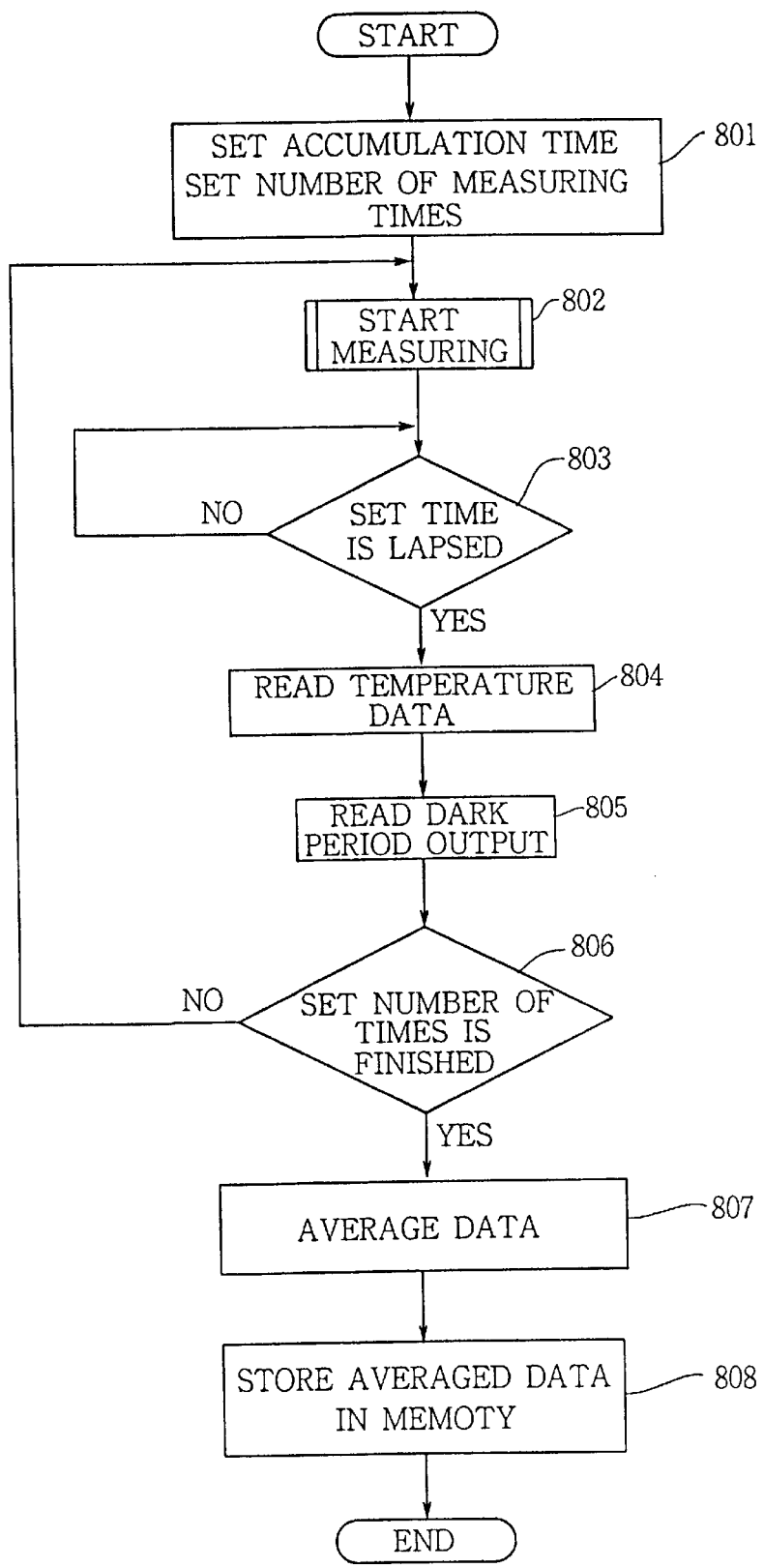
FIG. 8 is a flowchart showing an operation for reading a correction data of a black level of the image signal.

The operation for reading the first black level correction data of the image signal will be described with reference to a flowchart of FIG. 8.

In order to obtain the correction data having a good S/N ratio, the accumulation time is set to 64 ms and the temperature is 60° C.

At a step 801, the accumulation time of 64 ms and the number of measuring times of five (5) are set. Thus, as aforementioned, the random noises are eliminated and the S/N ratio is further improved. The number of measuring times and the accumulation time are variably set.

The measurement is started at a step 802. When the set accumulation time of 64 ms lapses at a step 803, the temperature data detected by the sensor 48 on the sensor 20 is read at a step 804.

At a step 805, the output data in the dark period of the sensor 20 is read. If the temperature read at the step 804 is not the set temperature of 60° C., the output is calculated as a value at the temperature of 60° C. For example, if the actual temperature is 58° C., the output data is calculated with a coefficient of $_2(60-58)/2$.

After the first reading of the output data, it is determined whether the number of measuring times is finished or not. If not, the program goes to the step 802 and a second reading is performed in the same manner. When the fifth reading is finished at the step 806, the average of the total of five output data is obtained at a step 807. The average data is stored in the correction data memory (ROM) 26 at a step 808.

In the operation, if the temperature of the dark room is controlled to keep constant, calculation with the coefficient is omitted.

Figure 6:
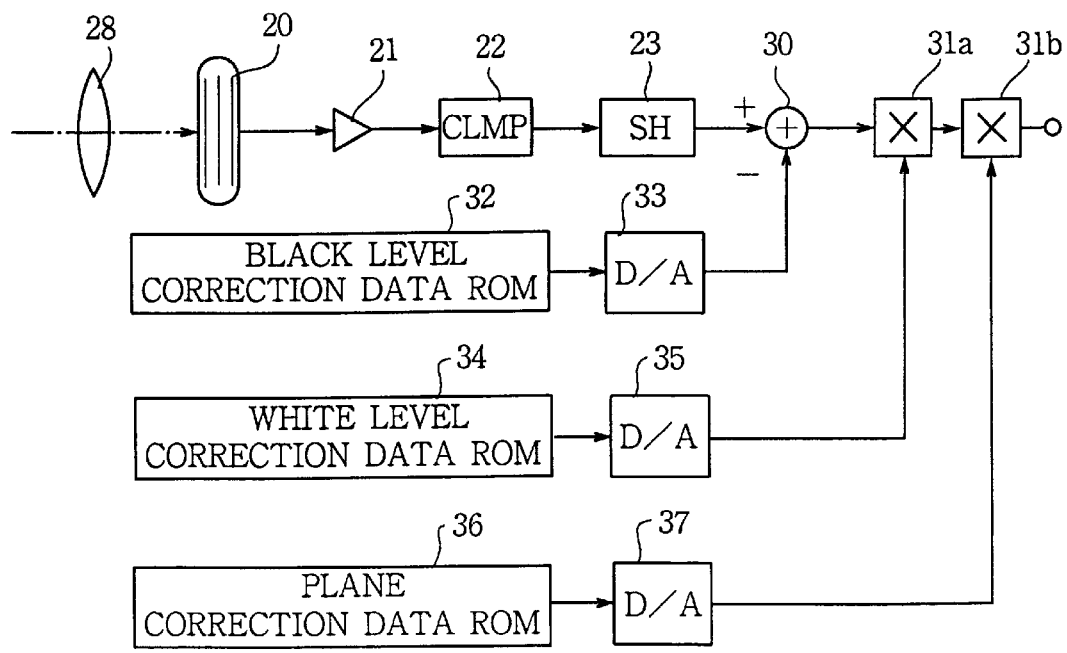
FIG. 6 is a diagram showing the image scanner system having correction data memories.

FIG. 6 shows the scanner of FIG. 1 having correction data memories which store data obtained in the aforementioned manner.

The light reflected from the object is applied to the linear imaging sensor 20 through a lens 28. The output signal of the sensor is amplified by the amplifier 21 to a necessary predetermined level. The clamper 22 and the sample and hold circuit 23 reduce noises of the amplified signal. The output signal of the sample and hold circuit 23 is applied to a subtracter 30.

The correction data memories comprises a black level correction data ROM 32, a white level correction data ROM 34, and a plane correction data ROM 36.

The black level correction data ROM 32 stores a correction data for correcting a black level of the signal. The black level correction data is converted into an analog signal by a D/A converter 33 and applied to the subtracter 30.

In the black level correction, the output level in the dark period of the sensor dependents on the set accumulation time and a surface temperature of the sensor. An accumulation time is previously set, and output data obtained by the sensor which is disposed in the dark room at a predetermined temperature is stored in the memory as a first correction data.

A normal accumulation time of the sensor for obtaining the image data is 10 ms. If the temperature of the sensor is 25° C., the output level in the dark period is 0.5 mV which is very small. However, if the accumulation time is 10 seconds, and the temperature is 60° C., the output level in the dark period becomes 10 mV. The output having a good S/N ratio is obtained.

If the accumulation time is 10 ms and the temperature of 25° C. rises to a temperature between 33 and 35° C., the output level becomes twice, namely, 1 mV.

The white level correction data ROM 34 stores a first white level correction data for correcting the white level of the signal with respect to the unequal distribution of sensitivities of photoelectric conversion elements of the line image sensor 20. The white level correction data is converted into an analog signal by a D/A converter 35 and applied to a multiplier 31a.

The plane correction data ROM 36 stores a second white level correction data for correcting the white level of the signal with respect to the unequal distribution of the quantity of light of the lens 28. The plane correction data is converted by a D/A converter 37 into an analog signal and applied to a multiplier 31b.

In the subtracter 30, the black level of the image signal is corrected in accordance with the black level correction data from the ROM 32. The corrected signal is applied to the multiplier 31a where the white level of the signal is corrected in accordance with the white level correction data from the ROM 34. The signal is applied to the multiplier 31b where the white level thereof is further corrected in accordance with the plane correction data from the ROM 36.

Figure 9:
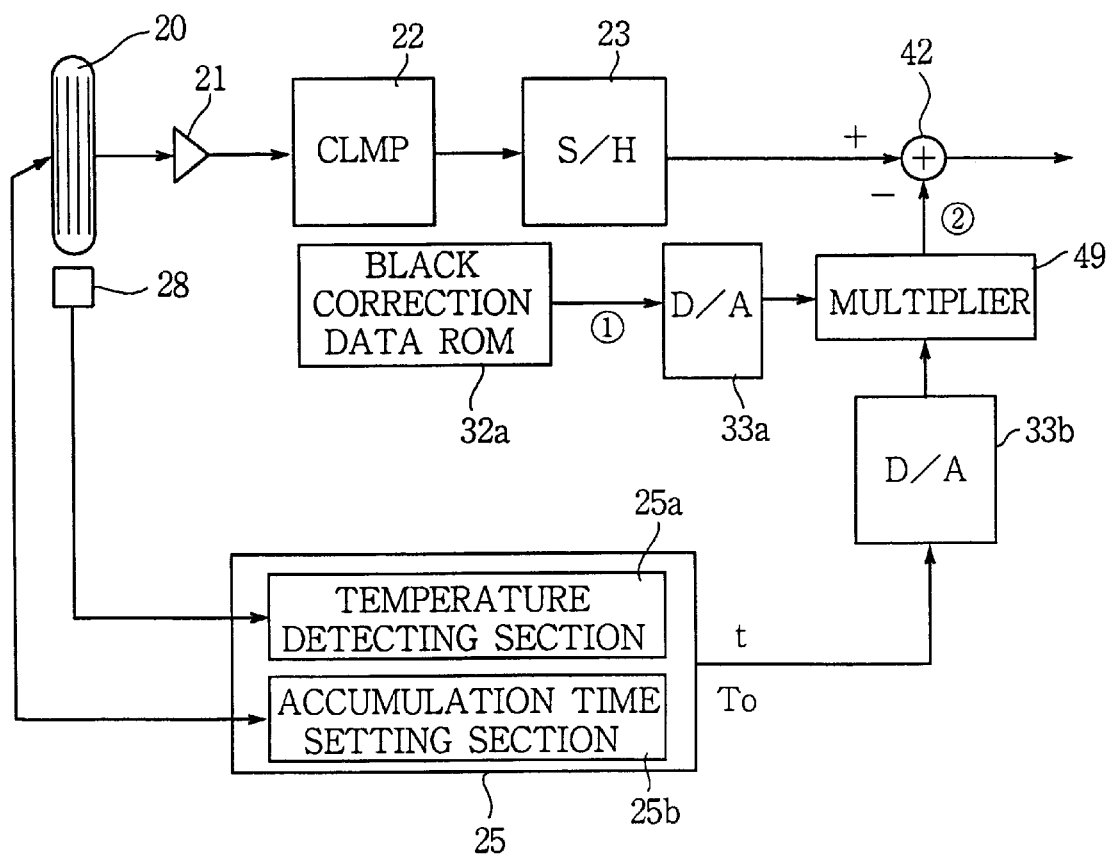
FIG. 9 is a diagram showing the image scanner system having a correction data memory for correcting the black level.

FIG. 9 shows a modification of a system for the black level correction data.

As hereinbefore described, the sensor 20 produces the dark period output signal of 0.5 mV, for the accumulation time of 10 ms, at the temperature of 25° C.

The output signal is applied to a subtracter 42 through the amplifier 21, damper 22, and sample and hold circuit 23. The first black level correction data stored in the black correction data ROM 32a is applied to a multiplier 49 through a D/A converter 33a.

The controller 25 has a temperature detecting section 25a applied with the temperature data detected by the temperature sensor 48, and an accumulation time setting section 25b. The controller applies the control signal to the multiplier 49 through a D/A converter 33b.

In the multiplier 49, the first black level correction data is multiplied with the data of temperature and accumulation time as a parameter. Thus, a second correction data of the black level is obtained.

The multiplier 49 has a control value K as follows.

$$K = \frac{T_0}{T_{INT}} \times 2^{\frac{(t-t_0)}{8}}$$

where $T_{INT}$ is the accumulation time (64 ms) for obtaining the first correction data, TO is the accumulation time (10 ms) for obtaining the image data, "to" is the temperature (60° C.) of the surface of the sensor 20 in the dark room 45, and t is the temperature of the sensor for obtaining the image data.

In the black level correction, the first correction data is multiplied with the control value K to obtain the second correction data. Thus, the image data is properly corrected.

Figure 10:
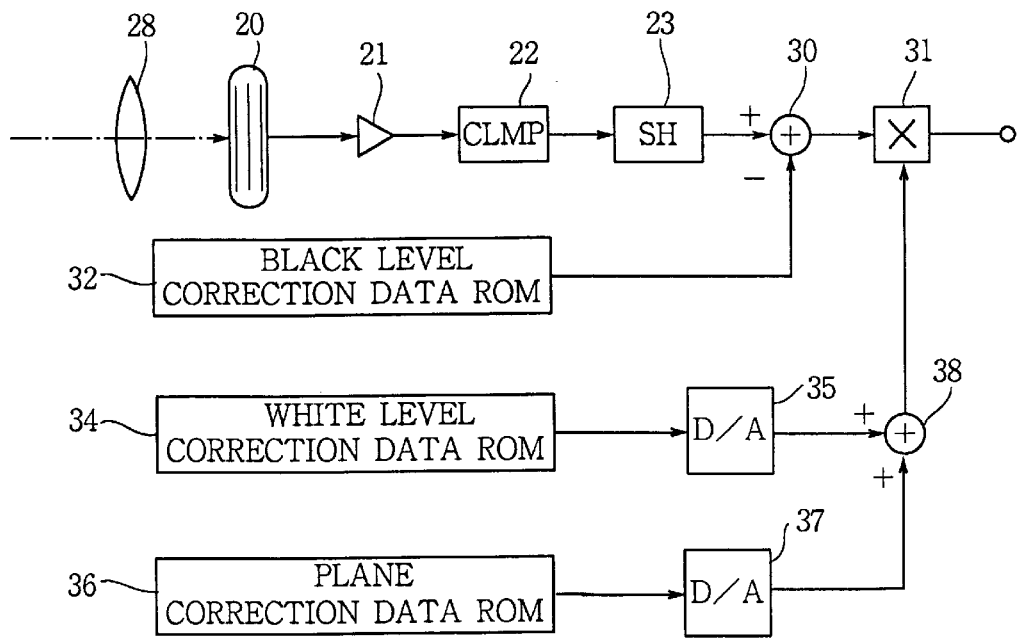
FIG. 10 is a diagram showing another embodiment of the invention for correcting the white level.

FIG. 10 shows another embodiment of the scanner. If the amount of data in the white data and plane data correction ROMs 34 and 36 is large, a multiplier 31 for controlling a logarithm is employed. In this state, it is necessary to calculate the data stored in the ROMs 34 and 36 by the logarithm. Each data is applied to the multiplier 31 through an adder 38.

Figure 11:
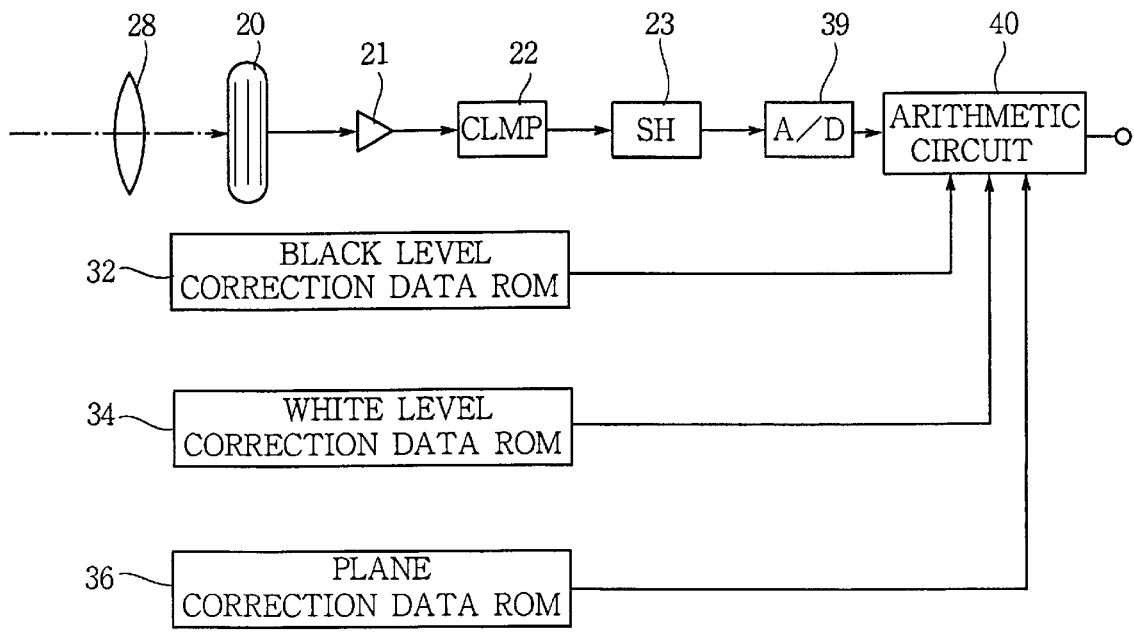
FIG. 11 is a diagram showing a further embodiment.
Figure 12:
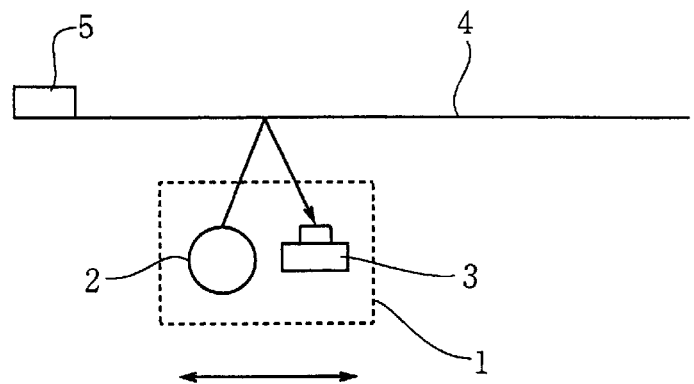
FIG. 12 is a schematic diagram showing a conventional image scanner system of a flat bed type.
Figure 13:
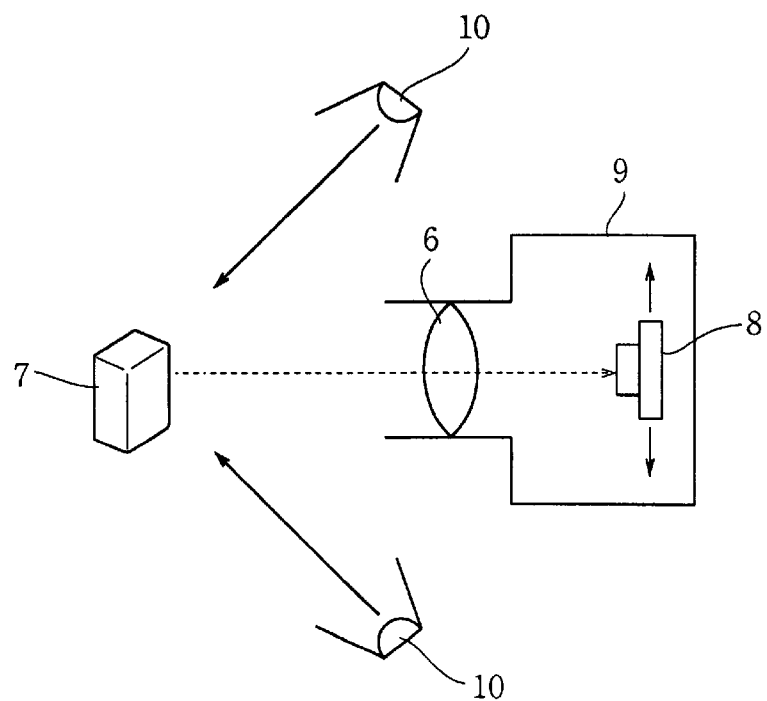
FIG. 13 is a schematic diagram showing another conventional scanner system of a camera type.
Figure 14:
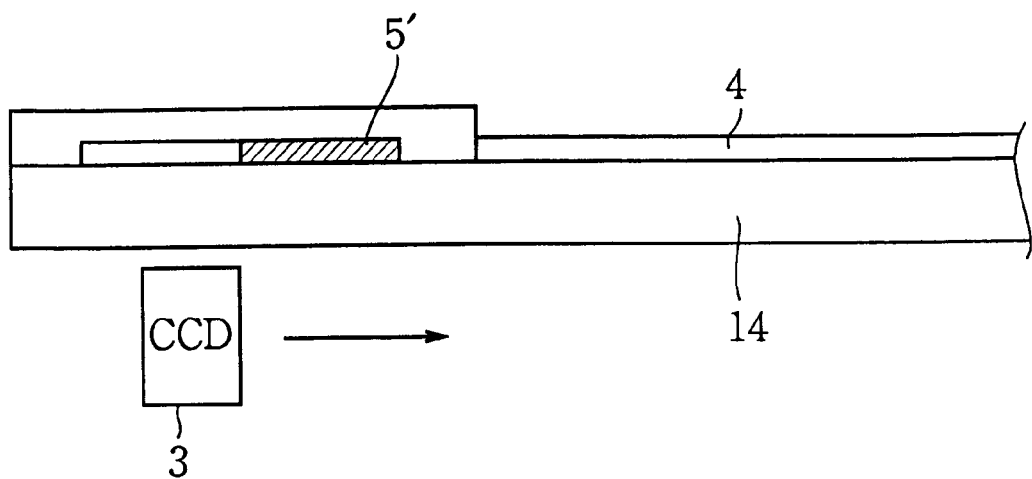
FIG. 14 is a schematic diagram showing a conventional image scanner system for correcting the black level with a standard sheet.
Figure 15:
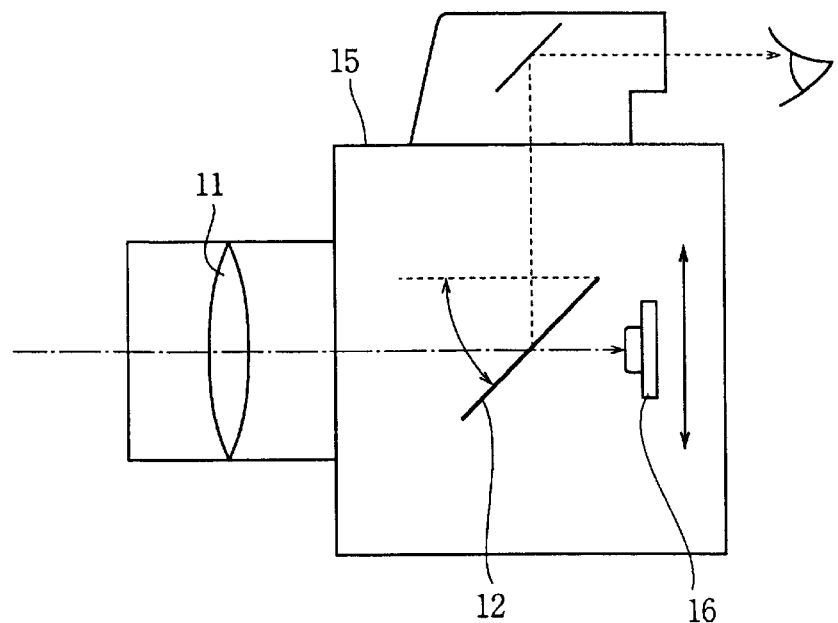
FIG. 15 is a schematic diagram showing another conventional scanner system.
Figure 16:
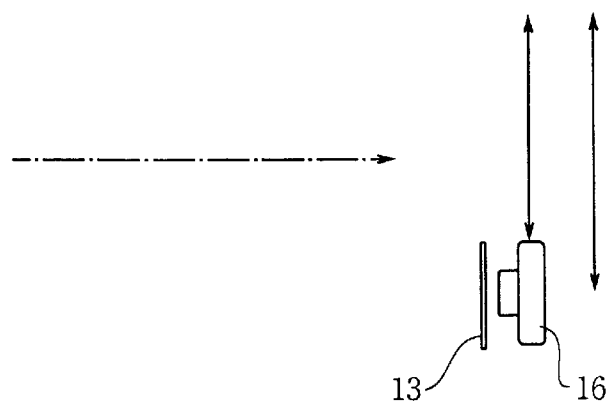
FIG. 16 is a schematic diagram showing a further conventional scanner system.

FIG. 11 shows a further embodiment of the scanner. If the data calculated by logarithm is used, an arithmetic circuit 40 is provided in place of the multiplier. It is possible to proceed in digital by a microcomputer.

In the white level correction, data of the unequal sensitivity of the photoelectric conversion elements of the sensor 20 is stored in the white level correction data ROM 34 as the first memory and data of the unequal light distribution of the lens 28 is stored in the plane correction data ROM 36 as the second memory. The image obtained by the sensor 20 is corrected with the stored correction data, thereby correcting the distortion of shading.

Consequently, it is not necessary to correct the unequal distribution of the lens 28 before reading the image data. Since the unequal distribution of the quantity of light of the lens 28 has a slow curvature as shown in FIG. 4, it is not necessary to complement the correction data at every pixel. For example, one picture is divided into a predetermined area, and each area is represented by one data. Thus, the amount of data stored in the plane correction data ROM 36 is extremely reduced.

In place of the line image sensor, a CCD sensor having a solid state image device which does not scan the line may be employed.

Although the deviation is stored in the correction data ROMs 34 and 36 as the inverse numbers and calculated in the multipliers, the deviation can be stored in the ROMs as it is. In this case, an arithmetic circuit is used in place of the multiplier.

In accordance with the present invention, the white level of the desired image data is corrected by multiplying the correction data. Thus, time for reading a desired picture is shortened. Since the storage capacity of the memory is reduced, the size of the system and the manufacturing cost can be reduced.

In the black level correction, at the predetermined temperature, the dark period output having a good S/N ratio obtained for the accumulation time which is longer than the accumulation time for reading the image data is stored in the black level correction data ROM 32a as the first black level correction data. When the image data is read, the first correction data is corrected based on the temperature of the sensor 20 and the accumulation time to obtain the second correction data.

Since the black level of the image data is corrected at the same time when the data is read, a light shielding mechanism can be omitted. Furthermore, it is not necessary to read the correction data before the image data is read, and to provide the scanning area for the correction data.

Consequently, the black level of the data is corrected with a simple structure and the time for reading the image data is shortened and the size of the system can be reduced.

While the invention has been described in conjunction with preferred specific embodiments thereof, it will be understood that these descriptions are intended to illustrate and not limit the scope of the invention, which is defined by the following claims.

What is claimed is:

1. A system for correcting image data comprising:

a lens for converging rays reflected from an object;

a line sensor receiving rays converged by the lens and having a plurality of photoelectric conversion elements corresponding to predetermined pixels of one line;

means for obtaining white level correction data for correcting a deviation of an output signal of each photoelectric conversion element from a standard value;

means for obtain plane correction data with respect to a whole plane of the object for correcting unequal distribution of quantity of light dependent on the lens; and correcting means for correcting an output signal of the line sensor with the white correction data and the plane correction data.

2. The system according to claim 1 wherein the deviation of the output signal is a deviation from an average value of the whole output signal.

3. The system according to claim 1 wherein the correcting means is means for multiplying the output signal of the line sensor by the white correction data and the plane correction data.

4. The system according to claim 1 further comprising a black level correcting system for producing black level correction data for correcting the output signal of the line sensor.

5. The system according to claim 4 wherein the black level correcting system comprises:

means for producing a dark correction data from an output signal of the line sensor in a dark condition, means for detecting temperature of the line sensor, means for setting an accumulation time of each of the photoelectric conversion elements, correcting means for correcting the output signal of the line sensor with the dark correction data, a detected temperature, and a set accumulation time.

6. The system according to claim 1, wherein the plane correction data is obtained for a predetermined number of pixels and plane correction data for remaining pixels is calculated based on the plane correction data of the predetermined number of pixels at corresponding positions.

7. The system according to claim 6, wherein the plane correction data at an interval between adjacent pixels is interpolated by an interpolation formula.

* * * * *